(12) United States Patent
Nadeau et al.

(10) Patent No.: US 8,163,145 B2
(45) Date of Patent: Apr. 24, 2012

(54) METHOD AND APPARATUS FOR CONTROLLING TOPOGRAPHICAL VARIATION ON A MILLED CROSS-SECTION OF A STRUCTURE

(75) Inventors: James P Nadeau, Beaverton, OR (US); Pei Zou, Fremont, CA (US); Jason H. Arjavac, Portland, OR (US)

(73) Assignee: FEI Company, Hillsboro, OR (US)

( * ) Notice: Subject to any disclaimer, the term of this patent is extended or adjusted under 35 U.S.C. 154(b) by 85 days.

(21) Appl. No.: 12/607,867

(22) Filed: Oct. 28, 2009

(65) Prior Publication Data
US 2010/0108506 A1    May 6, 2010

Related U.S. Application Data

(63) Continuation of application No. 10/716,181, filed on Nov. 18, 2003, now Pat. No. 7,611,610.

(51) Int. Cl.
C23C 14/34 (2006.01)
(52) U.S. Cl. .................... 204/298.36; 204/192.34
(58) Field of Classification Search .............. 204/298.36, 204/192.34
See application file for complete search history.

(56) References Cited

U.S. PATENT DOCUMENTS

| | | | |
|---|---|---|---|
| 3,627,599 A * | 12/1971 | Goldmacher et al. | 438/754 |
| 4,662,985 A | 5/1987 | Yoshida et al. | |
| 5,435,850 A | 7/1995 | Rasmussen | |
| 5,798,529 A | 8/1998 | Wagner | |
| 5,851,413 A | 12/1998 | Casella et al. | |
| 5,874,010 A | 2/1999 | Tao et al. | |
| 5,916,424 A * | 6/1999 | Libby et al. | 204/298.36 |
| 6,043,960 A | 3/2000 | Chang et al. | |
| 6,198,608 B1 | 3/2001 | Hong et al. | |
| 6,423,240 B1 | 7/2002 | Wang et al. | |
| 6,600,637 B1 | 7/2003 | Wang et al. | |
| 6,621,081 B2 | 9/2003 | Moran | |
| 6,889,113 B2 | 5/2005 | Tasker et al. | |
| 7,308,334 B2 | 12/2007 | Tasker et al. | |
| 2008/0097621 A1 | 4/2008 | Tasker et al. | |

FOREIGN PATENT DOCUMENTS

| | | |
|---|---|---|
| JP | 57050436 | 3/1982 |
| JP | 61222010 | 10/1986 |
| JP | H02-216605 | 8/1990 |
| JP | 04373127 | 12/1992 |
| JP | 2000-005938 | 1/2000 |
| JP | 2000-266651 | 9/2000 |
| WO | WO 03/019523 A1 * | 3/2003 |

OTHER PUBLICATIONS

Folch, Albert et al., "Electron Beam Deposition of Gold Nanostructures in a Reactive Environment," Appl. Phys. Lett., Apr. 17, 1995, pp. 2080-2082, vol. 66(16). Folch, Albert et al., "High-Vacuum Versus 'Environmental' Electron Beam Deposition," J. Vac. Sci. Technol. B, Jul./Aug. 1996, pp. 2609-2613, vol. 14(4).
Ochiai, Yukinori et al., "Electron-Beam-Induced Deposition of Copper Compound with Low Resistivity," J. Vac. Sci. Technol. B, Nov./Dec. 1996, pp. 3887-3891, vol. 14(6).
Japanese Office Action, mail date Nov. 8, 2011, JP App. No. 2006-541346.

* cited by examiner

*Primary Examiner* — Rodney McDonald
(74) *Attorney, Agent, or Firm* — Scheinberg & Griner, LLP; Michael O. Scheinberg; John Kelly

(57) ABSTRACT

An improved method of controlling topographical variations when milling a cross-section of a structure, which can be used to reduce topographical variation on a cross-section of a write-head in order to improve the accuracy of metrology applications. Topographical variation is reduced by using a protective layer that comprises a material having mill rates at higher incidence angles that closely approximate the mill rates of the structure at those higher incidence angles. Topographical variation can be intentionally introduced by using a protective layer that comprises a material having mill rates at higher incidence angles that do not closely approximate the mill rates of the structure at those higher incidence angles.

24 Claims, 7 Drawing Sheets

METHOD AND APPARATUS FOR CONTROLLING TOPOGRAPHICAL VARIATION ON A MILLED CROSS-SECTION OF A STRUCTURE

This application is a continuation of U.S. patent application Ser. No. 10/716,181, filed on Nov. 18, 2003, now U.S. Pat. No. 7,611,610 which is hereby incorporated by reference.

TECHNICAL FIELD OF THE INVENTION

The present invention relates to charged particle beam milling and, in particular, to a method of controlling topographical variation on a cross-section of a structure.

BACKGROUND AND SUMMARY OF THE INVENTION

Semiconductor manufacturing, such as the fabrication of integrated circuits, typically entails the use of photolithography. A semiconductor substrate on which circuits are being formed, usually a silicon wafer, is coated with a material, such as a photoresist, that changes solubility when exposed to radiation. A lithography tool, such as a mask or reticle, positioned between the radiation source and the semiconductor substrate casts a shadow to control which areas of the substrate are exposed to the radiation. After the exposure, the photoresist is removed from either the exposed or the unexposed areas, leaving a patterned layer of photoresist on the wafer that protects parts of the wafer during a subsequent etching or diffusion process.

The photolithography process allows multiple integrated circuit devices or electromechanical devices, often referred to as "chips," to be formed on each wafer. The wafer is then cut up into individual dies, each including a single integrated circuit device or electromechanical device. Ultimately, these dies are subjected to additional operations and packaged into individual integrated circuit chips or electromechanical devices.

A similar process is used to manufacture read write components for use in data storage drives. In a typical data storage drive, the data is stored on round, flat disks called platters, usually made of glass or an aluminum alloy. Special electromagnetic read/write devices called heads are used to either record information onto the disk or read information from it. The read/write heads transform electrical signals to magnetic signals, and magnetic signals back to electrical once again. Each bit of data to be stored is recorded onto the hard disk using a special encoding method that translates zeros and ones into patterns of magnetic flux reversals.

The portion of a write head that actually writes data on the disk is referred to as the write element. This element is typically made up of two poles that are separated by a gap. These poles generate a magnetic field when they are excited by a coil magnetically coupled to the poles. When the write element is in proximity to the disk, a magnetic field generated by the poles sets the magnetic orientation in given locations on the disk. In this manner, data is written on the disk.

As the computer industry continues to demand higher capacity and faster performance from hard disks and tape drives, there is an increasing demand for suppliers to increase the amount of data that can be stored on a given storage medium. This amount of data, referred to as areal density, is usually expressed as the number of bits of data per square inch of storage media. One of the major factors that determines the areal density of a hard disk is the track density. This is a measure of how tightly the concentric tracks on the disk can be packed. Track density is largely determined by the width of the tracks, which is in turn largely determined by the width of the write element. A large write element will affect a larger area on the surface of a platter than will a smaller write element. As a result, track width can be decreased (and track density increased) by making the poles of the write head physically narrower, especially at the write tip, thereby concentrating the magnetic field into a smaller area on the platter surface.

A large percentage of the write heads used today are thin-film heads, so named because of the way in which they are manufactured. During the manufacturing process, a substrate wafer is coated with one or more layers of a very thin film of alloy material deposited in specific patterns. Alternating layers of an insulating material are also deposited onto the substrate. Lithographic techniques similar to those used to manufacture semiconductor circuits are used to form the deposited layers into a pole-tip assembly having the desired geometry.

During the manufacturing process, variations in exposure and focus require that the patterns developed by lithographic processes be continually monitored or measured to determine if the dimensions of the patterns are within acceptable ranges. The importance of such monitoring, often referred to as process control, increases considerably as pattern sizes become smaller, especially as minimum feature sizes approach the limits of resolution available by the lithographic process. Typically, for structures such as write heads, the width dimension is one of the smallest feature dimensions, and it is the width dimension that is conventionally monitored to assess performance of the lithographic process.

Monitoring of pattern features and measurement of its dimensions, commonly referred to as metrology, is often performed using a charged particle beam system, such as a focused ion beam system (FIB), in conjunction with a scanning electron microscope (SEM).

During a typical metrology process, a FIB system is used to expose the cross-section of a structure, such as a write head, so that the structure width can be accurately measured. FIB systems are widely used in microscopic-scale manufacturing operations because of their ability to image, etch, mill, deposit, and analyze very small structures with great precision. FIB systems produce a narrow, focused beam of charged particles (hereinafter referred to as ions) that is typically scanned across the surface of a work piece in a raster fashion, similar to a cathode ray tube. In most commercial FIB systems, the ions used are positively charged gallium ions ($Ga^+$) extracted from liquid metal ion sources. The extracted ions are accelerated, collimated, and focused onto a work piece by a series of apertures and electrostatic lenses. The ion beam can be used to remove material from the work piece surface or to deposit material onto the surface. When used to remove material, often referred to as milling, the heavy gallium ions in the focused ion beam physically eject atoms or molecules from the surface by sputtering, that is, by a transfer of momentum from the incoming ions to the atoms at the surface.

Because FIB sputter-milling can cause significant damage to small structures, the structure surface is often coated with a protective layer of tungsten before milling begins. Such a layer can be deposited using a gas that decomposes in the presence of the ion beam and deposits material onto the surface. This process is commonly referred to as FIB-induced chemical vapor deposition (CVD). Typically the precursor gas, such as tungsten hexacarbonyl gas, is directed onto the work piece surface, usually via a fine needle inserted near the position of the ion beam. The gas is broken down into volatile and non-volatile components by the low energy electrons generated when the ion beam strikes the surface. The non-volatile component, in this case the protective tungsten coating, is deposited onto the surface, while the volatile component is pumped away.

Once the cross-section is exposed, a scanning electron microscope can be used to measure the width of the structure. The scanning electron microscope (SEM) allows for the production of an image of greater magnification and higher resolution than can be achieved by the best optical microscopes. An SEM produces a finely focused beam of electrons which is scanned across the surface of a work piece, typically in a raster pattern. The electrons that make up the electron beam are called primary electrons. When the electron beam is directed at the work piece surface, the primary electrons collide with electrons in orbit around the nuclei of the atoms present in the work piece causing the emission of secondary electrons. Some of the primary electrons will also be reflected from the work piece surface. These higher energy electrons (>50 eV) are called backscattered electrons. Both types of electrons can be detected by inserting an appropriate detector near the specimen. The detector produces a variable voltage output; the more secondary or backscattered electrons it detects, the greater will be the voltage generated.

The analog signal produced by the detector is typically converted into a digital brightness value by a device known as an Analog to Digital converter. The voltage of the detector's output signal is measured for each point in the scan (commonly referred to as a pixel) and assigned a number representing a digital brightness value for that pixel. Although the gray-level resolution (the number of shades of gray used in the image) can be varied, typically 256 gray levels are used, so that each point is assigned a value from 0 (black) to 255 (white) according to the intensity of the voltage. The value for each pixel is stored in a memory array and used to produce a multilevel gray image of the target surface in which the brightness of each point on the image is determined by the number of secondary or backscattered electrons ejected while the primary electron beam is impinging at that point. Areas where a relatively low number of electrons are emitted will appear darker in the image, while areas where a relatively high number of electrons are emitted will appear brighter.

The average number of secondary electrons produced per primary electron is called the secondary-electron coefficient (SEEC), and is typically in the range 0.1 to 10 (varying between different materials). The average number of backscattered electrons reflected per primary electron is called the backscattered-electron emission coefficient (BEEC). The number of electrons emitted at a given pixel depends on many factors, such as the topography of the sample, the curvature of the target surface, the electron emission coefficient of the target material, and even (especially for backscattered electrons) the atomic number of the elements present in the sample. Because different materials may have significantly different electron emission coefficient values, the yield of emitted electrons, whether secondary or backscattered detection is employed, may be used as a contrast mechanism to distinguish between different materials on a surface—especially where the difference between the electron emission coefficients of the two materials is relatively high.

Typically, to measure the width of cross-section of a structure, the SEM is used in conjunction with automatic metrology software. As the electron beam is scanned across the exposed cross-section, whether secondary or backscattered detection is employed, there will typically be a change in electron intensity at the edges of the structure. This change can be due to a change to topography or to a transition between two different materials. An algorithm is used to assign an edge position based upon the contrast at the edges of the structure and to determine the distance between those edges. Thus, the accuracy of the algorithm's edge position determination determines the accuracy of the width measurement.

Unfortunately, there are a number of problems when the above-described processes are used to monitor the width of very small structures such as modern write-head poles. SEM image based metrology relies upon the ability to make measurements between gray level transitions. Gray level variations in an SEM image can either result from changes in topography or from material differences. For structures such as the write heads discussed above (which are covered with a protective overcoat prior to FIB cross-sectioning) the edges that must be detected and measured are formed solely by material differences between the pole structure and its overcoat material. In order to accurately measure the distance between two such material boundaries, it is desirable to reduce or eliminate any variation in topography so that measurements are based entirely upon the difference in material.

When a FIB system is used to mill a cross section of a selected structure of interest which has been coated with a protective layer of a second material, a phenomenon known as "curtaining" often affects the accuracy of any subsequent SEM measurement. FIG. 1A is a SEM micrograph of a cross-section of a typical NiFe write-head with a tungsten overcoat. Write-head 150 is composed of a compound known as Permalloy—an 81/19 alloy of nickel and iron. Overcoat 140 is composed of tungsten deposited to protect the write-head during FIB milling and to provide the necessary gray level difference for edge-finding and width measurement of the pole. As illustrated by FIG. 1A, the edges of the write-head in areas 120 and 130 are not well defined because artifacts from the milling process associated with using tungsten as the overcoat material partially obscure the material boundaries. This is commonly referred to as curtaining.

FIG. 1B is a SEM micrograph of the same cross-section observed from a slight angle with respect to the vertical face of the cross-section. As can be seen in area 132, the Permalloy write-head 150 is actually recessed slightly with respect to the tungsten layer 140. During ion beam milling, sputtered material can redeposit on the workpiece surface. A recess, as shown in FIG. 1B, tends to collect redeposited material during the milling process. The resulting variation in topography results in gray level variations in an SEM image that partially obscures the boundary or edge between the Permalloy write-head and the tungsten overcoat layer. The poorly defined transition between the Permalloy and the tungsten results in the curtaining effect discussed above. Curtaining can make edge recognition difficult and can possibly lead to a less accurate cross-section measurement by automated metrology software.

One approach to the problem of curtaining is the use of a tilted ion beam to mill the cross-section. The workpiece is then rotated 90 degrees, and the ion beam is used to remove some of the redeposited material. This approach, however, suffers from a number of shortcomings. First, because the cross-section is milled at an angle, the actual vertical cross-section measure must be calculated from the angled measurement. The resulting width determination is less accurate than if the vertical cross-section were to be measured directly. Further, the process takes significant additional time because the cross-section must be milled, the sample rotated, and then the redeposited material must be removed before an SEM image can be taken and measurements can be performed. Any increase in time required to complete a critical dimension measurement process is very undesirable for any in-line process control.

Thus, there is still a need for an improved method of controlling topographical variations when milling a cross-section of a structure such as a write head pole. A reduction in topographical variation will produce a more planar cross-section face and accordingly can improve the accuracy of metrology applications such as measuring a width of the cross-section of such a structure.

SUMMARY OF THE INVENTION

It is an object of the invention, therefore, to allow improved control over topographical variations when milling a cross-section of a structure, such as reducing topographical variation on a cross-section of a write-head in order to improve the accuracy of metrology applications. A preferred embodiment of the invention described and claimed herein comprises the use of a protective layer deposited over the structure, followed by ion milling to expose the cross-section of the structure, and SEM metrology to determine dimensions such as the width of the structure. In a preferred embodiment of the invention, topographical variation is reduced by using a protective layer which comprises a material having mill rates at higher incidence angles (up to 90 degrees) that closely approximates the mill rates of the structure at those higher incidence angles. In another preferred embodiment of the invention, a protective layer of carbon is deposited over a structure composed of Permalloy to allow for improved metrology of the Permalloy structure. In still another preferred embodiment of the invention, topographical variation can be intentionally introduced by using a protective layer that comprises a material having mill rates at higher incidence angles that do not closely approximate the mill rates of the structure at those higher incidence angles.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF PREFERRED EMBODIMENTS

Preferred embodiments of the present invention are directed to methods and an apparatus for controlling topographic features or variations on a milled cross-section of a structure. The topographic features that can result from milling the cross-section can be reduced or even eliminated by careful matching of the substrate (the material that the feature is composed of) with a protective overcoat material. Specifically, an appropriate overcoat material according to the invention will have a mill rate at higher incidence angles (up to 90 degrees) that closely approximates the mill rate of the substrate material at those higher incidence angles at which the milling cross section is formed. Preferred embodiments of the present invention can thus be used to produce a cross-section face that is almost perfectly planar. This allows for SEM metrology based entirely upon material differences rather than variations in topography, which is desirable for metrology on a structure. In contrast, topographical variations can be intentionally introduced by choosing an overcoat material having a dissimilar mill rate at higher incidence angles than the mill rate of the substrate at those higher incidence angles.

Although much of the following description is directed toward the measurement of the width of a structure, the methods of the present invention are equally applicable to any application where charged particle beam milling is used to expose a cross-section of a small structure of a first material which has been coated with a layer of a second material. Further, although much of the following description is also directed toward the use of focused ion beams to mill the cross-section and electron beams to image and measure the cross-section, the methods of the present invention could equally be utilized with other milling and imaging techniques including other types of charged particle beam systems, electron beam milling, or optical processing. Hence, the scope of the present invention should not be limited to the specific embodiments discussed herein.

Figure 2:
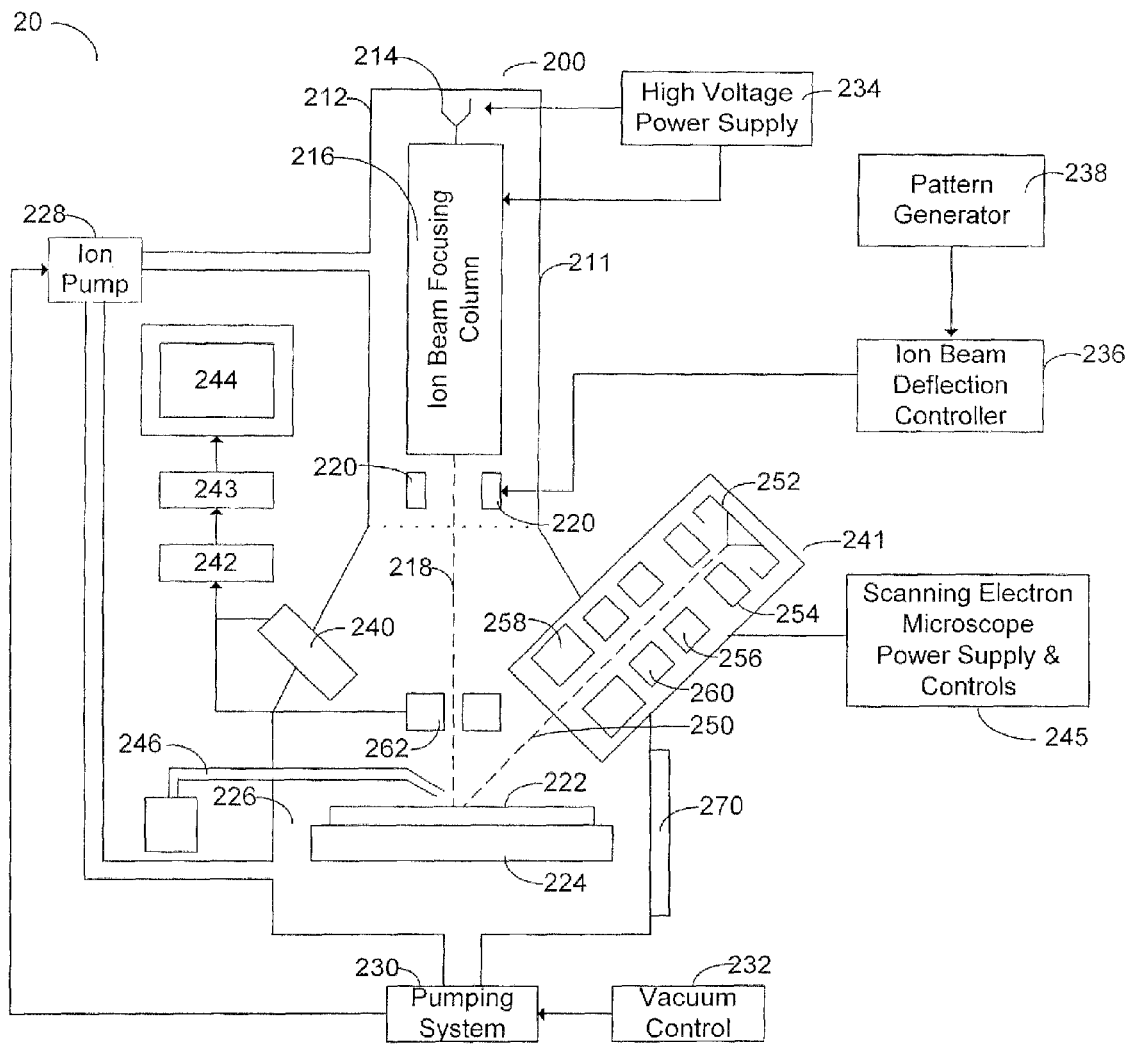
FIG. 2 shows a typical prior art dual beam FIB/SEM system.

FIG. 2 shows a typical dual beam FIB/SEM system 20 used to implement one aspect of the present invention. Focused ion beam system 200 includes an evacuated envelope 211 having an upper neck portion 212 within which are located an ion source 214 and a focusing column 216 including extractor electrodes and an electrostatic optical system. Ion beam 218 passes from ion source 214 through column 216 and between electrostatic deflection means schematically indicated at 220 toward sample 222, which comprises, for example, a semiconductor device positioned on movable X-Y stage 224 within lower chamber 226. An ion pump 228 is employed for evacuating neck portion 212. The chamber 226 is evacuated with turbomolecular and mechanical pumping system 230 under the control of vacuum controller 232. The vacuum system provides within chamber 226 a vacuum of between approximately $1 \times 10^{-7}$ Torr and $5 \times 10^{-4}$ Torr. If an etch assisting, an etch retarding gas, or a deposition precursor gas is used, the chamber background pressure may rise, typically to about $1 \times 10^{-5}$ Torr.

High voltage power supply 234 is connected to ion source 214 as well as to appropriate electrodes in focusing column 216 for forming an ion beam 218 and directing the same downwardly. Deflection controller and amplifier 236, operated in accordance with a prescribed pattern provided by pattern generator 238, is coupled to deflection plates 220 whereby beam 218 may be controlled to trace out a corresponding pattern on the upper surface of sample 222. In some systems the deflection plates are placed before the final lens, as is well known in the art.

The ion source 214 typically provides a metal ion beam of gallium, although other ion sources, such as a multicusp or other plasma ion source, can be used. The ion source 214 typically is capable of being focused into a sub one-tenth micron wide beam at sample 222 for either modifying the sample 222 by ion milling, enhanced etch, material deposition, or for the purpose of imaging the sample 222. A charged particle multiplier 240 used for detecting secondary ion or electron emission for imaging is connected to amplifier 242. The amplified signals are converted into digital signals and subjected to signal processing by the signal processor unit 243. The resulting digital signal is to display an image of workpiece 222 on the monitor 244.

A scanning electron microscope 241, along with power supply and control unit 245, is also provided with the FIB system 200. An electron beam 250 is emitted from a cathode 252 by applying voltage between cathode 252 and an anode 254. Electron beam 250 is focused to a fine spot by means of a condensing lens 256 and an objective lens 258. Electron beam 250 is scanned two-dimensionally on the specimen by means of a deflection coil 260. Operation of condensing lens 256, objective lens 258, and deflection coil 260 is controlled by power supply and control unit 245.

Electron beam 250 can be focused onto workpiece 222, which is on movable X-Y stage 224 within lower chamber 226. When the electrons in the electron beam strike workpiece 222, secondary electrons are emitted. These secondary electrons are detected by secondary electron detector 240 or by backscattered electron detector 262, which are connected to an amplifier 242. The amplified signals are converted into digital signals and subjected to signal processing by the signal processor unit 243. The resulting digital signal is to display an image of workpiece 222 on the monitor 244.

A gas delivery system 246 extends into lower chamber 226 for introducing and directing a gaseous vapor toward sample 22. U.S. Pat. No. 5,851,413 to Casella et al. for "Gas Delivery Systems For Particle Beam Processing," assigned to the assignee of the present invention, describes a suitable fluid delivery system 246. Another gas delivery system is described in U.S. Pat. No. 5,435,850 to Rasmussen for a "Gas Injection System," also assigned to the assignee of the present invention.

A door 270 is opened for inserting sample 222 onto stage 224, which may be heated or cooled, and also for servicing an internal gas supply reservoir, if one is used. The door is interlocked so that it cannot be opened if the system is under vacuum. The high voltage power supply provides an appropriate acceleration voltage to electrodes in ion beam column 216 for energizing and focusing ion beam 218. Dual beam FIB/SEM systems are commercially available, for example, from FEI Company, Hillsboro, Oreg., the assignee of the present application.

FIB system 200 is first used to apply a protective layer to a structure of interest on workpiece 222, such as a permalloy write head on a magnetic recording head wafer, typically composed of a material such as Aluminum Titanium Carbide (AlTiC). The protective layer is deposited, for example, using an appropriate gas delivered by gas delivery system 246 via a fine needle inserted near the position of the ion beam. The gas decomposes in the presence of the ion beam and deposits material onto the surface. For example, naphthalene gas can be used to deposit a protective layer of carbon.

FIB system 200 then directs an ion beam 218 toward the structure of interest in order to expose the cross-section of the structure so that the structure width can be accurately measured. A typical system might use a beam current of 1 nA, a beam energy of 30 keV, a beam diameter of 5 nm to 50 nm, and a dwell point spacing of 2 to 200 nm. Skilled persons can readily determine appropriate beam characteristics to suit a particular application. Once the cross-section is exposed, scanning electron microscope 41 can be used to measure the width of the structure.

Scanning electron microscope 241 produces a finely focused electron beam 250, which is scanned across the surface of the structure, preferably in a raster pattern. When the electrons in the electron beam 250 strike the surface of work piece 222, secondary electrons and backscattered electrons are emitted. Respectively, these electrons are detected by secondary electron detector 240 or backscattered electron detector 262. The analog signal produced either by secondary electron detector 240 or backscattered electron detector 262 is amplified by amplifier 242 and converted into a digital brightness value by signal processor unit 243. As the electron beam 250 is scanned across the exposed cross-section, there will be a change in emitted electron intensity at the edges of the structure. An algorithm is used to assign an edge position based upon the difference in brightness values or contrast at either of the edges of the structure and to determine the distance between those edges. A typical system might use an electron beam current of 10 to 100 pA, a beam energy of 1 keV, and an electron beam current density of 2000 A/cm$^2$. A typical system might also use an electron beam spot size of 2 to 5 nm, a refresh period of approximately 0.5 to 5 seconds, and a scanning field width of 0.5 to 5.0 microns. Again, skilled persons can readily determine appropriate beam characteristics to suit a particular application.

When using the FIB system shown in FIG. 2 to mill a cross-section of a structure of interest, the etch rate of the ion milling is very much dependent upon the incidence angle. The incidence angle of an ion beam is defined as the angle of the beam with respect to a normal to the target surface. Milling rate (also referred to as sputter rate) typically increases with the beam angle of incidence up to a certain angle, then decreases. Although most materials follow this general rule, the exact milling rate at a given incidence angle, along with the incidence angle resulting in the highest milling rate, will vary from material to material. For example, the milling rate for tungsten increases with beam angle of incidence until the beam angle is around 75°, then it decreases.

Figure 3:
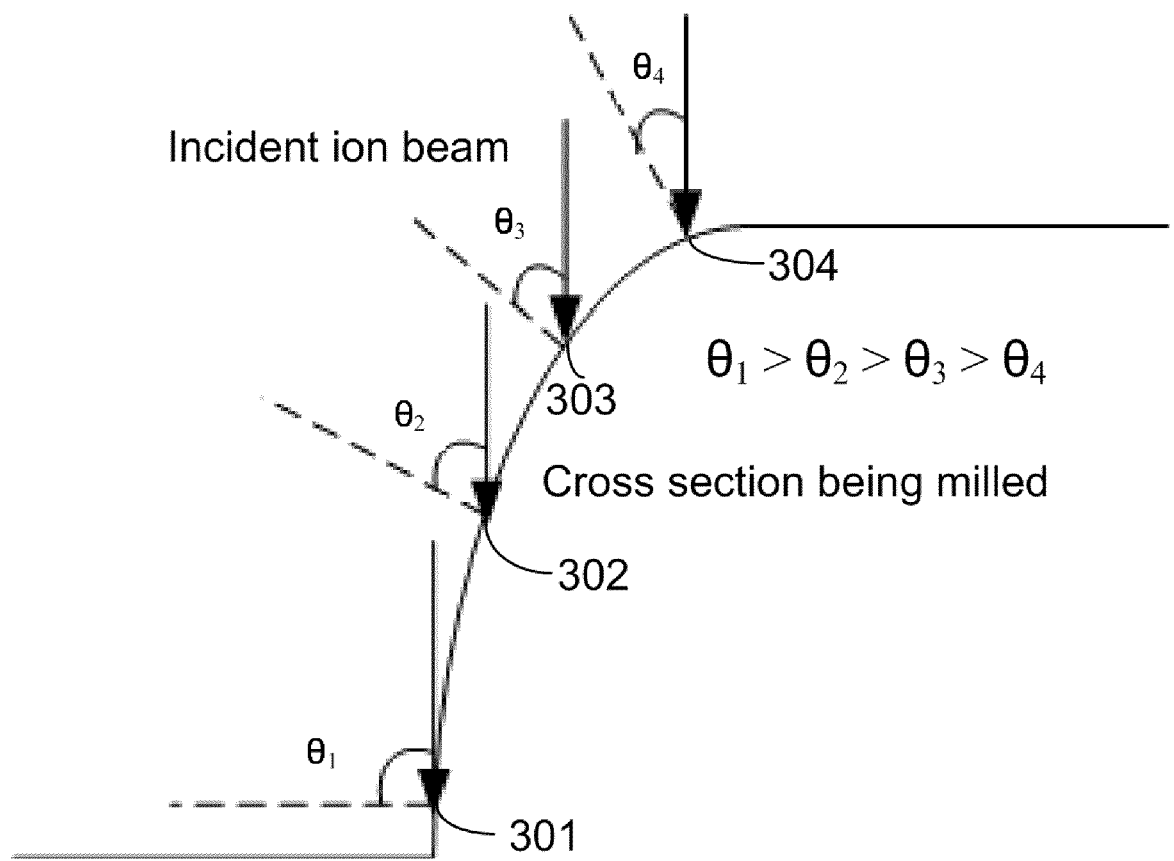
FIG. 3 shows the different ion beam incidence angles that can result as a cross-section is exposed during a milling process.

During the process of using a FIB to mill a cross-section, the ion beam will have a different incidence angle at different locations on the workpiece surface at different stages in the milling process. FIG. 3 illustrates the different angles that can result during the milling process. As the ion beam is directed at points 301 through 304, the corresponding angle of incidence will be $\theta_1$ for point 301, $\theta_2$ for point 302, $\theta_3$ for point 303, and $\theta_4$ for point 304. As shown by FIG. 3, the surface of the workpiece at point 304 is nearly perpendicular to the ion beam, and the resulting incidence angle ($\theta_4$) is relatively small. As the ion beam moves to successive points 303, 302, and 301, the incidence angles become larger. For point 301, located where the workpiece surface has been milled to produce the final, nearly vertical wall of the cross section, the incidence angle can approach 90 degrees. The cross-section face is formed mainly through FIB milling at high incidence angles. Skilled persons will recognize that the incidence angle that forms a cross-section face might vary depending on milling conditions.

Where the surface cross-section being milled is composed of two different materials, such as a permalloy write-head with a tungsten overcoat, the two materials will not only have different milling rates, the difference in milling rate will vary at different incidence angles.

Figure 4:
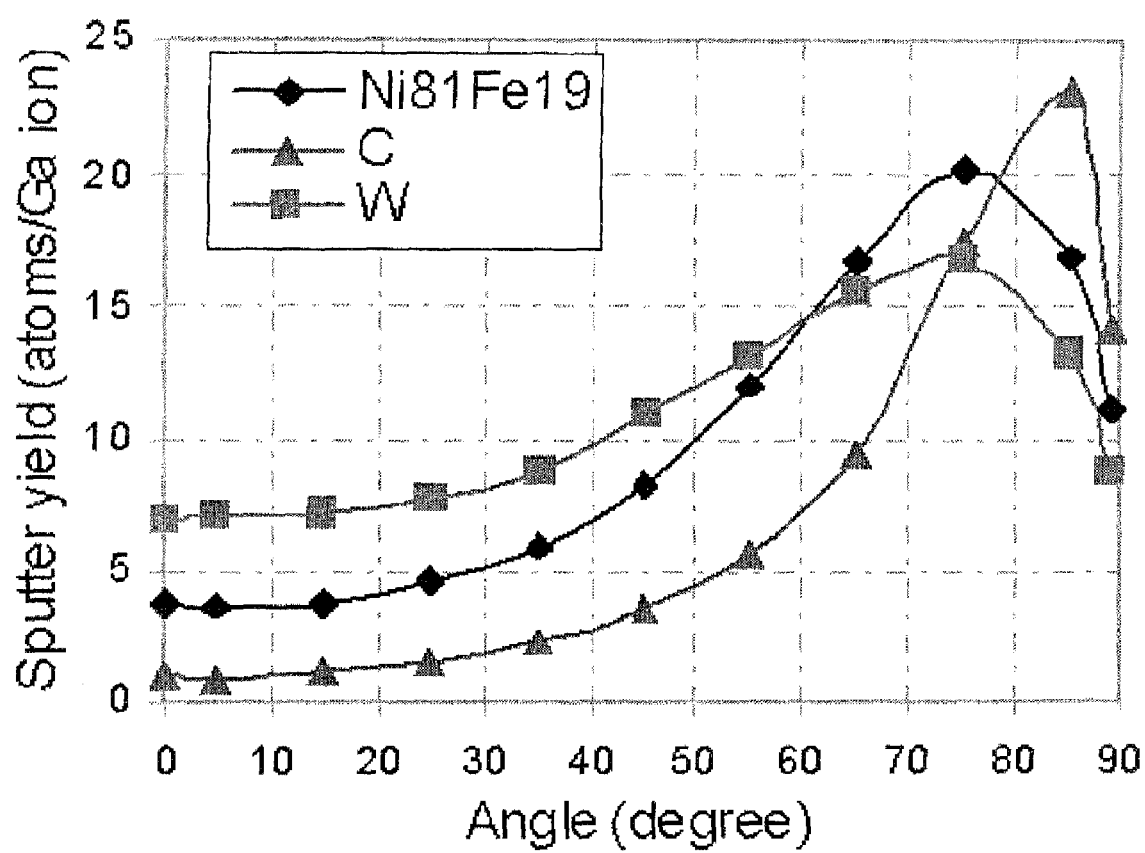
FIG. 4 is a graph showing mill rate versus beam incidence angle for various materials.

FIG. 4 shows the relationship between mill rate (sputter yield) and beam incidence angle for tungsten, NiFe (permalloy), and carbon. The values were calculated using a Monte Carlo simulation program. As shown by the graph, the mill rate of tungsten is higher than the mill rate of NiFe at an incidence angle smaller than 60 degrees. Above 60 degrees, however, NiFe will mill faster than tungsten. The difference is particularly pronounced when the beam incidence angle is around 75 degrees.

Figure 1A:
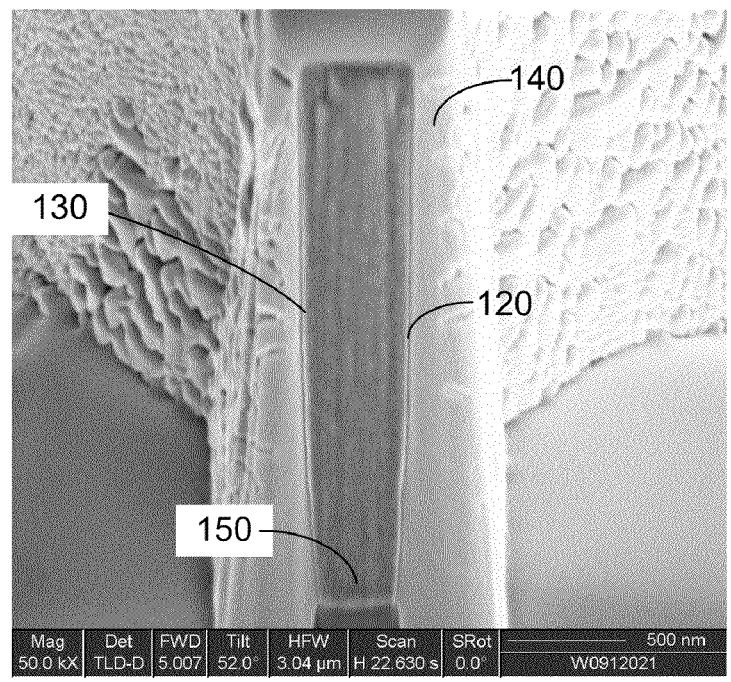
FIG. 1A is a SEM micrograph of a cross-section of a typical prior art Permalloy write-head with a tungsten overcoat.
Figure 1B:
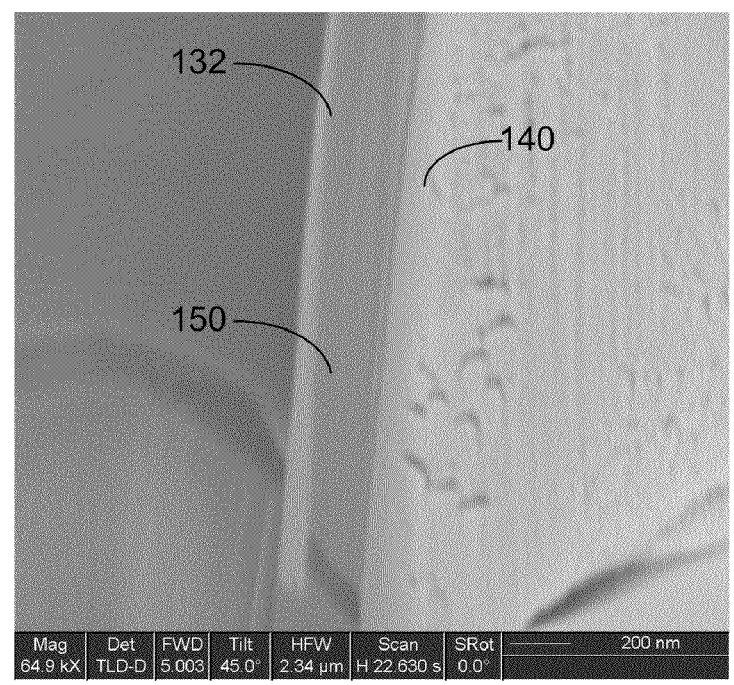
FIG. 1B is a SEM micrograph of the cross-section of FIG. 1A observed from a slight angle with respect to the cross-section face.

Applicants believe that this difference in milling rate results in the curtaining effect described above. Referring again to FIG. 1A and FIG. 1B, the higher milling rate of Permalloy at higher incidence angles (greater than 75 degrees up to an angle approaching 90 degrees) as compared to tungsten will result in faster milling of the Permalloy sidewalls. As a result, the vertical surface of the Permalloy write-head will be recessed with respect to the slower milling tungsten layer. This recess tends to collect sputtered material at the permalloy-tungsten interface, which in turn results in a poorly defined transition between the Permalloy and the tungsten.

This recess, along with the curtaining effect it causes, is a topographical artifact associated with the selection of the overcoat material (tungsten) and the process of producing the cross section. Topographical variations, resulting both from the recess and the collection of sputtered material, introduce gray level variations in the image that compete with the more relevant contrast mechanism based on material differences. These gray level variations can make edge recognition difficult and can possibly lead to a less accurate cross-section measurement by automated metrology software.

Figure 5:
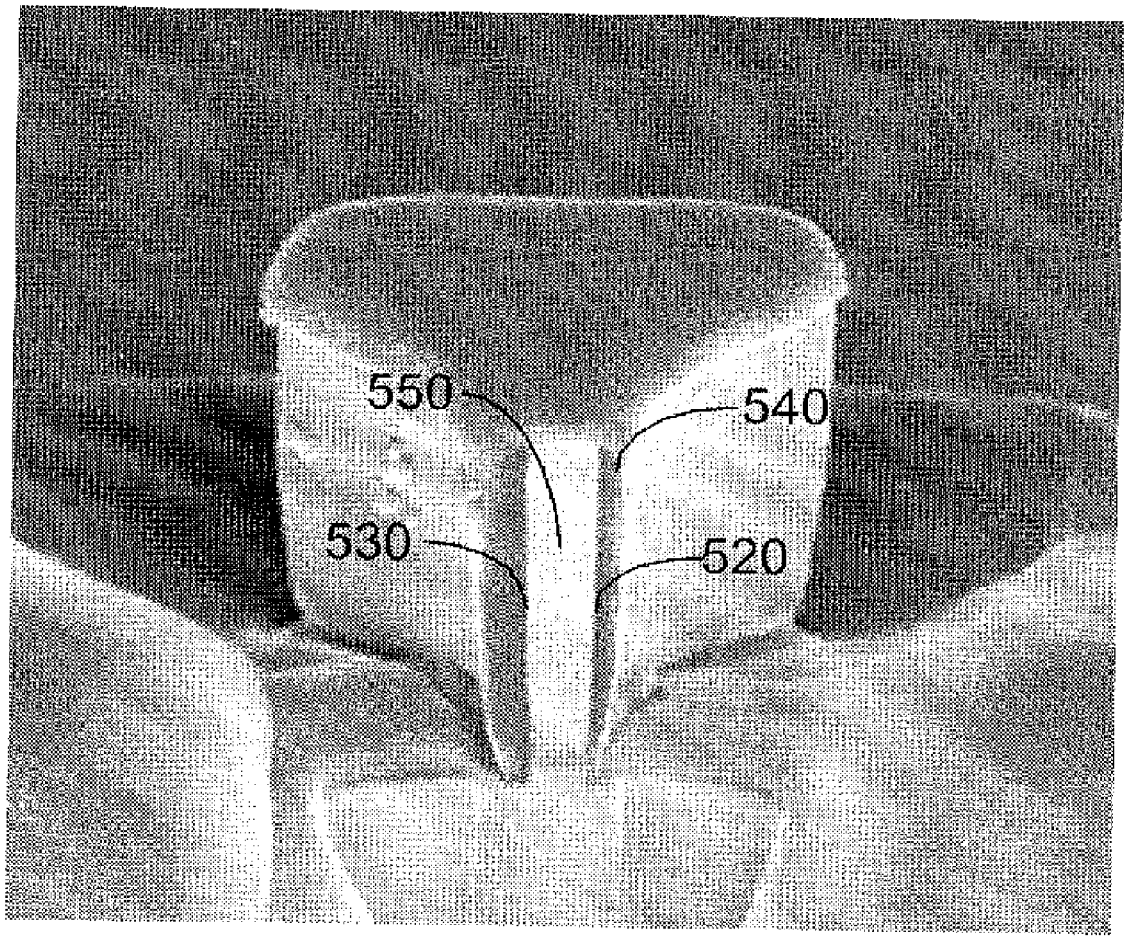
FIG. 5 is a SEM micrograph of a cross-section of a Permalloy write-head with a carbon overcoat according to the present invention.

The mill rate of carbon, however, is slightly higher than the mill rate of NiFe at higher incidence angles. Therefore, it can be predicted that milling a cross-section of a Permalloy structure with a carbon overcoat will not result in a Permalloy recess or the resulting curtaining seen with tungsten. FIG. 5 is a SEM micrograph of a cross-section of a Permalloy write-head 550 with a carbon overcoat 540. As illustrated by FIG. 5, the edges of the write-head 550 in areas 520 and 530 are quite well defined and exhibit none of the curtaining observed in FIG. 1A.

By matching the mill rate of the overcoat material and the underlying structures, topographical variations resulting from milling the cross-section are minimized to a point where they will not affect the metrology. The resulting measurements are more precise and more robust to process variations. Typically, the closer the milling rates can be matched at the higher incidence angles which actually form the cross-section face, the more topographical variations resulting from the milling process will be reduced.

For a typical milling process, the cross-section face will be formed at incidence angles from around 75 degrees up to 90 degrees. As a result, matching the mill rates for this range of incidence angles is preferred. However, skilled persons will recognize that variations in milling conditions, for example variation in mill pattern or ion beam dose, can sometimes result in a cross-section forming at a different incidence angle. Applicants believe that matching milling rates through a larger range of high incidence angles (from around 45 degrees up to 90 degrees) would allow topographical variations to be controlled for a much wider range of milling conditions. Due to the limited number of available overcoat materials, however, it may not always be possible to match mill rates through a larger range of higher incidence angles. For most metrology applications using typical milling conditions, it will be preferable to match mill rates at incidence angles higher than 75 degrees. In most cases, this will not only allow for a significant reduction in topographical variation over the prior art, but will also result in a number of acceptable overcoat materials—which in turn will allow factors such as electron emission contrast (discussed below) or ease of overcoat application to be taken into consideration.

Carbon also has the advantage of providing a better electron emission contrast with NiFe than does tungsten. As discussed above, the yield of emitted electrons may be used as a contrast mechanism to distinguish between different materials on a surface. A greater relative difference between the emitted electron coefficients of two materials allows for more accurate edge determination.

For example, the backscattered electron emission coefficient for Ni/Fe (with a 2 keV beam energy) is approximately 0.2 to 0.3, while the backscattered electron emission coefficient for tungsten is approximately 0.4. The BEEC for tungsten thus differs from the BEEC for Permalloy by a factor of about 1.6. Carbon, on the other hand, has a backscattered electron emission coefficient of approximately 0.07. The BEEC for carbon differs from the BEEC for Permalloy by a factor of about 3.6. As a result, the contrast between carbon and Permalloy is much greater than the contrast between tungsten and Permalloy. This greater contrast can allow a more accurate edge determination and thus a more accurate measurement of the width of the cross-section.

Figure 6:
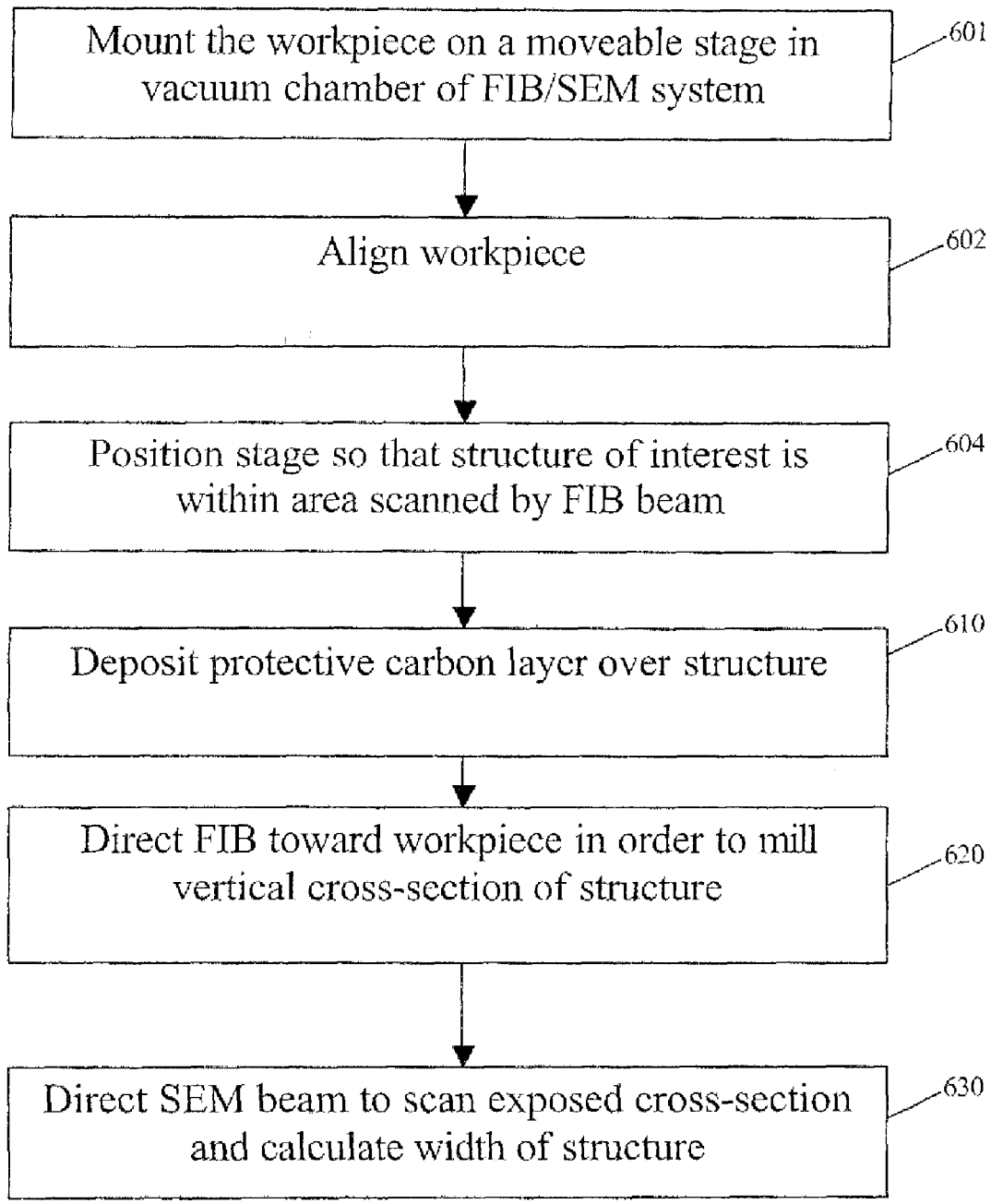
FIG. 6 is a flowchart showing the steps in determining the width of a structure composed of Permalloy according to the present invention.

In accordance with the present invention, the use of carbon rather than tungsten as an overcoat material will greatly enhance the accuracy of the determination of the width of a structure composed of Permalloy. FIG. 6 is a flowchart showing the steps in determining the width of a structure composed of Permalloy according to the present invention.

In step 601, the workpiece is loaded into an FIB/SEM system such as the one illustrated in FIG. 2 by mounting the workpiece on the FIB/SEM stage. The workpiece can be loaded manually or automatically, for example by an automatic handler system.

In step 602, the workpiece is aligned. This alignment can also be accomplished manually, for example by an operator using an optical microscope, or automatically, for example by using an automatic handler robot which locates a notch or flat edge of the workpiece in order to determine the proper orientation.

In step 604, the stage is positioned so that the structure of interest is within the area scanned by the charged particle beam. This positioning can be accomplished, for example, by storing and using positional coordinates.

In step 610, structure of interest is coated with a protective layer of carbon by way of a gas that decomposes in the presence of the ion beam and deposits material onto the surface. A precursor gas, such as naphthalene gas, is directed onto the workpiece surface. The gas is broken down by the ion beam into volatile and non-volatile components—the non-volatile component, in this case a protective carbon coating, is deposited onto the surface, while the volatile component is pumped away.

In step 620, the FIB system is used to expose the cross-section of the structure of interest, such as a Permalloy write head, by milling through the protective layer and the structure of interest.

Once the cross-section is exposed, in step 630, a scanning electron microscope is used to measure the width of the structure through the use of an algorithm that determines the location of two edges of the structure of interest. As the SEM beam is scanned across the exposed cross-section, the algorithm is used to assign an edge position based upon the contrast at the edges of the structure and to determine the distance between those edges.

According to the present invention, the same general steps can be followed to determine the width of a structure composed of a material other than Permalloy provided that an appropriate overcoat material is substituted for the carbon layer. Applicants have discovered that matching the milling rate of the protective layer and the structure being measured at higher incidence angles (greater than 75 degrees up to an angle approaching 90 degrees) reduces curtaining. Where the protective coating mills at about the same rate as the structure, topographical artifacts that can collect redeposited particles are minimized. The lack of topographical variation in the milled cross section results in a more defined edge between the two materials and, as a result, more accurate determination of the structure's width by an SEM and automated metrology software.

Preferably, an appropriate overcoat material will have a mill rate at higher incidence angles that closely approximates the mill rate of the structure material. Most preferably, an appropriate overcoat material will have a mill rate at higher incidence angles that is equal to or slightly higher than the mill rate of the structure material. Skilled persons will realize that an overcoat material with a slightly lower mill rate than the structure at higher incidence angles might provide acceptable results, but there would likely be some degree of curtaining. As discussed above, where possible, it is desirable for the mill rates of overcoat and substrate to match throughout a broader range of higher incidence angles (for example from 45 degrees approaching 90 degrees) in order to account for variations in milling conditions.

Figure 7:
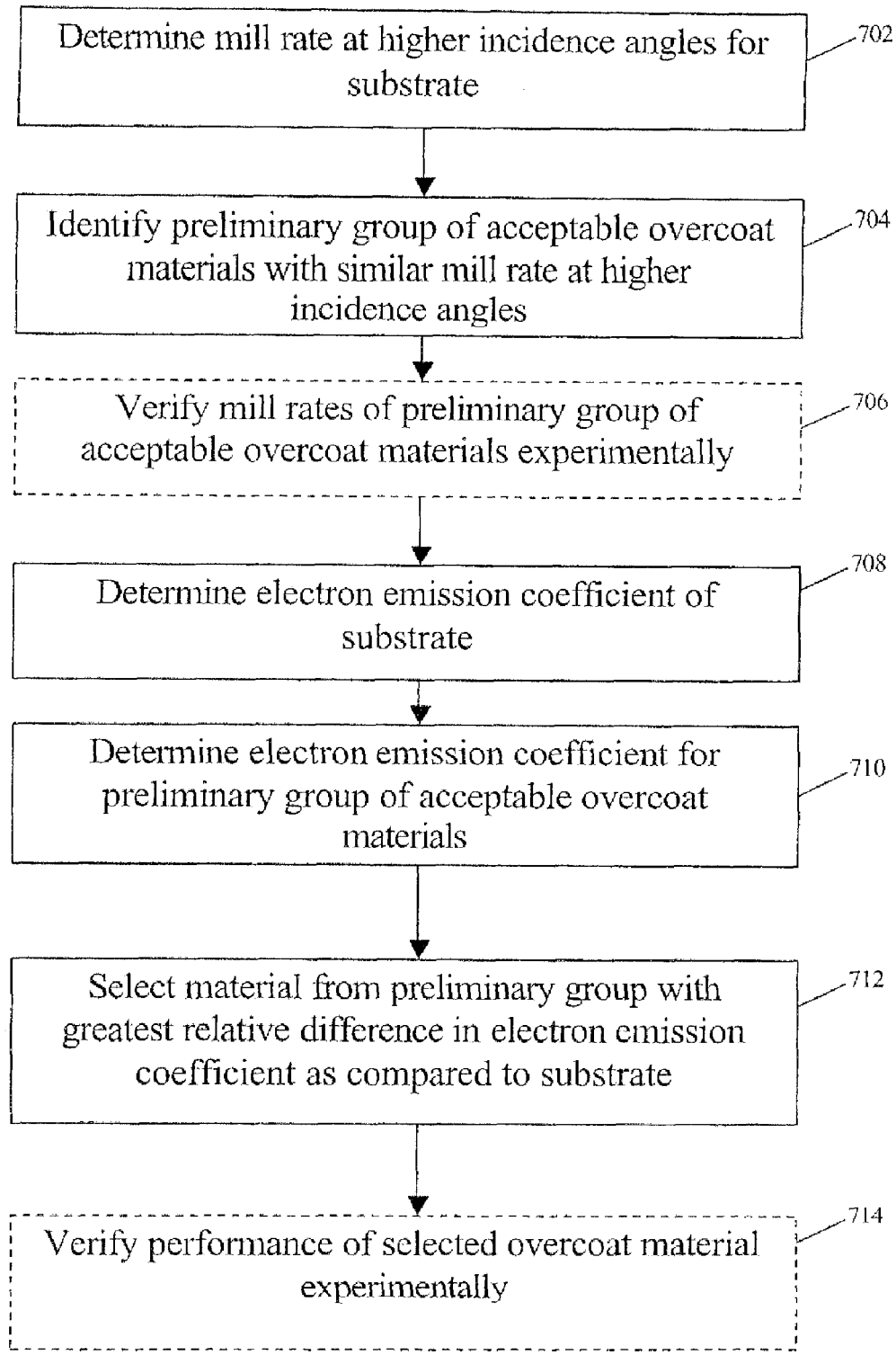
FIG. 7 is a flowchart showing the steps of selecting a suitable overcoat material according to a preferred embodiment of the present invention.

FIG. 7 is a flowchart showing the steps of selecting a suitable overcoat material in order to control topographical variation in a milled cross-section according to a preferred embodiment of the present invention.

In step 702, the mill rate at incidence angles greater than 75 degrees for the material making up the structure of interest is determined. This mill rate can be determined, for example, experimentally. Known mill rates at specific incidence angles can also be found in literature, or by performing calculations using one of the commercially available simulation software packages. For some applications, it might be desirable to determine mill rates at incidence angles above 45 degrees.

In step 704, a preliminary group of acceptable overcoat materials is identified by using reference values for mill rates throughout the desired range of incidence angles. As discussed above, in order to reduce topographical variation, an appropriate overcoat material will have mill rate throughout the desired range of incidence angles that closely approximates the mill rate of the structure material over that same range of incidence angles.

In optional step 706, the milling rates of acceptable overcoat materials found in known references can be verified experimentally.

In step 708, the appropriate electron emission coefficient (EEC) for the structure material is determined (depending upon the type of electron detection employed). The electron emission coefficient can be determined, for example, experimentally. Known electron emission coefficient values for different materials can also be found in literature.

In step 710, the EEC for the preliminary group of acceptable overcoat materials is determined. The EEC for this group of materials can also be determined, for example, experimentally or by using known EEC values for different materials as found in literature.

In step 712, an appropriate overcoat material is determined from the preliminary group of acceptable overcoat materials by selecting the acceptable material with the greatest relative difference in EEC as compared to the structure material. Skilled persons will recognize that in some circumstances, it might be desirable to choose an overcoat other than the material with the greatest relative difference in EEC. For example, where the overcoat material with the greatest relative difference in EEC is very expensive or difficult to use, it might be preferable to use a material with a lower difference in EEC. In such cases, skilled persons will recognize that a greater difference in EEC is more desirable, but must be balanced against other factors.

In optional step 714, the performance of a selected overcoat material can be verified experimentally as discussed above.

Once an acceptable material is selected, the process as described above can be implemented to produce a cross-section with well-defined edges. The selected material can be deposited over the structure as a protective layer, followed by ion milling to expose the cross-section of the structure, and SEM metrology to determine the width of the structure. The present invention thus allows for improved metrology of a cross-section of a structure and thus more effective process control.

Although much of the previous description is directed toward the measurement of the width of a structure, the methods of the present invention are equally applicable to any application where charged particle beam milling is used to expose a cross-section of a small structure of a first material which has been coated with either a protective or functional layer of a second material. For example, the methods described above could be used to produce a more planar face when using FIB milling to manufacture structures such as micro-minors for use in optical switch arrays for telecommunications, large screen displays for projectors, or even as part of a channel for planar laser devices. In such an application, improved flatness of the minor face would be very desirable.

Further, skilled persons will recognize that the method described above could also be applied to produce a non-flat cross-section surface. If, for example, it is desirable to produce a recessed cross-section face, an appropriate overcoat material according to the invention would have a mill rate at high incidence angles that is lower than the mill rate of the substrate at high incidence angles. During ion beam milling, the substrate material would mill faster than the overcoat material, resulting in a recessed substrate face.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention.

Accordingly, the appended claims are intended to include within their scope such processes, machines, manufacture, compositions of matter, means, methods, or steps.

The invention claimed is:

1. An apparatus for measuring a dimension of a cross-section of a structure composed of a first material, the apparatus comprising:
an ion beam system and gas delivery system for depositing a layer of a second material on said structure;
said second material having mill rates at higher incidence angles that match the mill rates of the first material at those incidence angles;
wherein the ion beam system is also used for directing an ion beam at the structure in order to expose a planar cross-section of the structure and said layer of the second material;
an electron beam system for directing an electron beam at the planar cross section; and
a computer program comprising computer-executable instructions stored in non-transitory memory for:
determining the width of the structure from the cross section based on the distance between two or more edges of the structure, the distance determined by:
assigning an edge position at either of the edges of the structure, the edge position based upon a brightness or contrast value assigned to either of the edges;
measuring the distance between the two assigned edge positions;
choosing the second material to be deposited on the structure composed of the first material prior to milling in order to control topological variation of the cross-section of said structure, by
determining the approximate mill rate of the first material at higher incidence angles; and
selecting a second material from known materials having a mill rate at higher incidence angles that match the mill rates of the first material at those incidence angles.

2. The apparatus of claim 1 in which selecting a second material from known materials comprises selecting a second material having mill rates at incidence angles greater than 45 degrees that match the mill rates of the first material at incidence angles greater than 45 degrees.

3. The apparatus of claim 2 in which selecting a second material from known materials comprises selecting a second material having mill rates at incidence angles greater than 45 degrees that are equal to or greater than the mill rates of said first material at incidence angles greater than 45 degrees.

4. The apparatus of claim 1 in which selecting a second material from known materials comprises:
selecting a preliminary group of materials from known materials with mill rates at higher incidence angles that match the mill rates of said first material at higher incidence angles;
determining the electron emission coefficient of said first material;
determining the electron emission coefficient of each selected preliminary material; and
selecting from said preliminary group, an appropriate second material having the greatest relative difference in electron emission coefficient as compared to said first material.

5. The apparatus of claim 1 in which said first material comprises an alloy of Ni and Fe.

6. The apparatus of claim 1 in which said second material is carbon.

7. The apparatus of claim 1 in which assigning an edge position at either of the edges of the structure comprises forming an image of said cross-section on an image forming device and applying an algorithm to assign an edge position based upon gray-level variations.

8. A system for selecting a material to be deposited as a protective layer on the structure composed of the first material prior to milling in order to control topological variation of the cross-section of said structure, by:
determining whether a planar or non-planar cross-section topography is desired;
determining the approximate mill rate of the first material at higher incidence angles;
if a planar cross-section is desired, selecting a protective layer material from known materials having a mill rate at higher incidence angles that match the mill rates of the first material at those incidence angles; and
if a non-planar cross-section is desired, selecting a protective layer material from known materials having a mill rate at higher incidence angles that does not match the mill rates of the first material at those incidence angles.

9. The system of claim 8 in which a planar cross-section is desired and in which selecting a protective layer material from known materials having a mill rate at higher incidence angles that match the mill rates of the first material at those incidence angles comprises selecting a protective layer material having mill rates at incidence angles greater than 75 degrees that match the mill rates of the first material at incidence angles greater than 75 degrees.

10. The system of claim 8 in which a planar cross-section is desired and in which selecting a protective layer material from known materials having a mill rate at higher incidence angles that match the mill rates of the first material at those incidence angles comprises selecting a protective layer material having mill rates at incidence angles greater than 75 degrees that that are equal to or greater than the mill rates of the first material at incidence angles greater than 75 degrees.

11. The system of claim 8 in which a planar cross-section is desired and in which selecting a protective layer material from known materials having a mill rate at higher incidence angles that match the mill rates of the first material at those incidence angles comprises selecting a protective layer material having mill rates at incidence angles greater than 45 degrees that match the mill rates of the first material at incidence angles greater than 45 degrees.

12. The system of claim 8 in which a planar cross-section is desired and in which selecting a protective layer material from known materials having a mill rate at higher incidence angles that match the mill rates of the first material at those incidence angles comprises selecting a protective layer material having mill rates at incidence angles greater than 45 degrees that that are equal to or greater than the mill rates of the first material at incidence angles greater than 45 degrees.

13. An apparatus for exposing a cross-section of a structure composed of a first material, the apparatus comprising:
a charged particle beam system and gas delivery system for depositing a protective layer of a second material on said structure; and
a computer program comprising computer-executable instructions stored in non-transitory memory to carry out the steps in the system of claim 8.

14. An apparatus for exposing a cross-section of a structure composed of a first material, the apparatus comprising:
a charged particle beam system and gas delivery system for depositing a protective layer of a second material on said structure; and a computer program comprising computer-executable instructions stored in non-transitory memory for choosing the second material to be deposited as a protective layer on the structure composed of the first material prior to milling in order to control topological variation of the cross-section of said structure, by:

determining whether a planar or non-planar cross-section topography is desired;

determining the approximate mill rate of the first material at higher incidence angles;

if a planar cross-section is desired, selecting a protective layer material from known materials having a mill rate at higher incidence angles that match the mill rates of the first material at those incidence angles; and if a non-planar cross-section is desired, selecting a protective layer material from known materials having a mill rate at higher incidence angles that does not match the mill rates of the first material at those incidence angles.

15. The apparatus of claim 14 in which a planar cross-section is desired and in which selecting a second material from known materials comprises selecting a second material having mill rates at incidence angles greater than 75 degrees that match the mill rates of the first material at incidence angles greater than 75 degrees.

16. The apparatus of claim 14 in which a planar cross-section is desired and in which selecting a second material from known materials comprises selecting a second material having mill rates at incidence angles greater than 75 degrees that are equal to or greater than the mill rates of said first material at incidence angles greater than 75 degrees.

17. The apparatus of claim 14 in which a planar cross-section is desired and in which selecting a second material from known materials comprises selecting a second material having mill rates at incidence angles greater than 45 degrees that match the mill rates of the first material at incidence angles greater than 45 degrees.

18. The apparatus of claim 14 in which a planar cross-section is desired and in which selecting a second material from known materials comprises selecting a second material having mill rates at incidence angles greater than 45 degrees that are equal to or greater than the mill rates of said first material at incidence angles greater than 45 degrees.

19. The apparatus of claim 14 in which selecting a second material from known materials comprises:

selecting a preliminary group of materials from known materials with mill rates at higher incidence angles that match the mill rates of said first material at higher incidence angles;

determining the electron emission coefficient of said first material;

determining the electron emission coefficient of each selected preliminary material; and selecting from said preliminary group, an appropriate second material having the greatest relative difference in electron emission coefficient as compared to said first material.

20. The apparatus of claim 14 in which a non-planar cross-section comprising a recessed cross-section face is desired.

21. The apparatus of claim 20 in which selecting a second material from known materials comprises selecting a second material having mill rates at incidence angles greater than 45 degrees that are that are substantially lower than the mill rates of said first material at incidence angles greater than 45 degrees.

22. The apparatus of claim 20 in which selecting a second material from known materials comprises selecting a second material having mill rates at incidence angles greater than 75 degrees that are that are substantially lower than the mill rates of said first material at incidence angles greater than 75 degrees.

23. The apparatus of claim 14 wherein the computer program also includes computer-executable instructions for controlling the charged particle beam system and the gas delivery system to:

deposit the selected protective layer using beam induced deposition; and mill the structure in order to expose a cross-section of the structure of the desired type.

24. The apparatus of claim 23 wherein the computer program also includes computer-executable instructions for determining the width of the structure from the cross section based on the distance between two or more edges of the structure, the distance determined by assigning an edge position at either of the edges of the structure and then measuring the distance between the two assigned edge positions, the edge position based upon a brightness or contrast value assigned to either of the edges.

* * * * *